(No Model.)
F. W. WOOD & J. FOWLER.
BRAKE FOR STREET CARS.
No. 472,597. Patented Apr. 12, 1892.
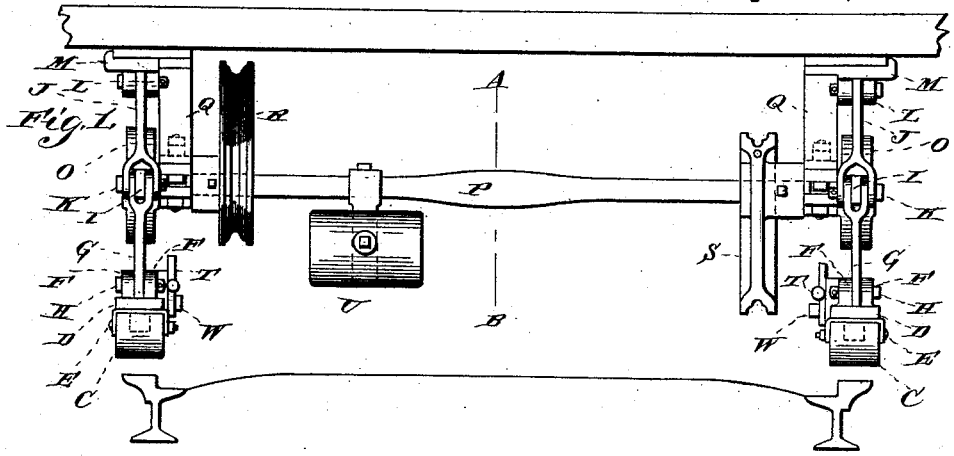
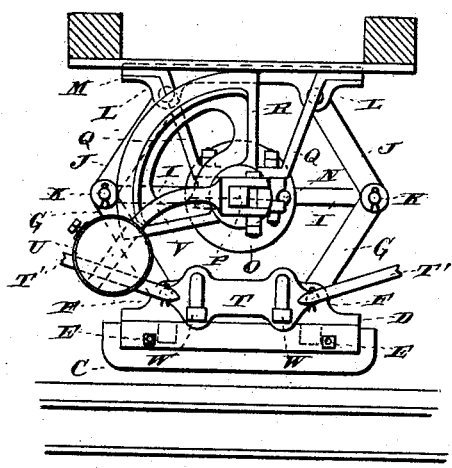
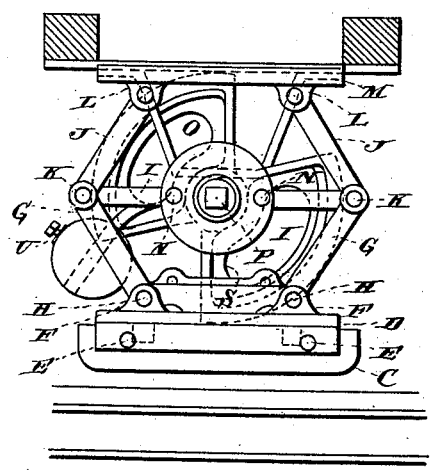
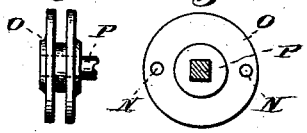 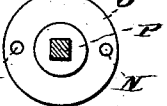
Witnesses:
Inventors:
Fred W Wood
John Fowler

UNITED STATES PATENT OFFICE.

FRED W. WOOD AND JOHN FOWLER, OF LOS ANGELES, CALIFORNIA.

BRAKE FOR STREET-CARS.

SPECIFICATION forming part of Letters Patent No. 472,597, dated April 12, 1892.

Application filed July 24, 1891. Serial No. 400,660. (No model.)

*To all whom it may concern:*

Be it known that we, FRED W. WOOD and JOHN FOWLER, citizens of the United States, residing at the city of Los Angeles, county of Los Angeles, and State of California, have invented a new and useful Brake for Street Cars or Dummies, Either Horse, Electric, or Cable Cars.

Our invention relates to the type of brakes denominated "track-brakes"—that is to say, our brake acts by means of the friction created by forcing the shoe or brake-block downward on the top of the track-rail. It can be applied to any style of car or truck and is actuated by means of the ordinary brake windlass and chain from either or both ends of the car, or can be operated by means of a lever and ratchet.

Figure 1 is a view of our improved brake as applied to an ordinary street-car. The wheels and boxes and axles of the car are not shown, to avoid confusion of lines. Fig. 2 is a side view of one side of our brake, looking toward the left from the line A B in Fig. 1, and Fig. 3 is an outside end view of our brake. Figs. 4 and 5 are detailed views of the small recessed wheel O.

Similar letters refer to similar parts throughout all the drawings.

C is the brake block or shoe, of wood, iron, or other material, which is fastened to the bottom plate D by suitable bolts E. When wood is used for the shoe C, then the bottom plate D is provided with downwardly-projecting side pieces, through which the bolts E pass, and thus secure the shoe C to the plate D. The plate D is of cast-iron or other metal and is provided with the lugs F, with which the lower ends of the lower connecting-links G are fastened by the bolts H. The upper ends of the lower connecting-links G are forked or split, as shown in the drawings, and between the two prongs is introduced the outer end of the horizontal connecting-arm I. The lower end of the upper connecting-link J is also forked or split and fits over and outside of the prongs of the link G, and through the three pieces—viz., the upper forked end of the lower connecting-link G and the outer end of the horizontal connecting-arm I and the lower forked end of the upper connecting-link J—is passed the bolt K. The upper ends of the upper connecting-links J are connected to suitable lugs L on the upper plate M. This upper plate M is fastened to the frame of the car or truck, preferably at some point between the wheels, by suitable bolts. The inside ends of the horizontal connecting-arms I are fastened by bolts N to the rim of a small wheel O, said rim being grooved, as shown in Figs. 4 and 5, for this purpose. This small wheel O is rigidly mounted on a shaft P. The shaft P and all its attachments are supported by the brackets Q, which are provided with suitable boxes and connected with the frame of the car or truck.

On the shaft P are mounted the quadrants R and S. At the lower side of the quadrant R is fastened a chain, which passes around and over the arc of the quadrant and then out by suitable rods to the windlass or lever at an end of the car, while a chain which is fastened to the upper side of the quadrant S passes around and over the arc of the quadrant and then by suitable rods and chains to the windlass or lever at the other end of the car. The weight U is secured by a suitable set-screw to the outer end of the bent lever V, which is also fastened rigidly to the shaft P at any convenient point. The weight U is made sufficiently heavy so that when both brake-chains are slack it drops down, and thus rotates the shaft P into a position which brings the forks I horizontal and raises the shoe C upward from the track-rail.

To operate this brake, power is applied at one or both ends of the car by means of the ordinary windlass or any arrangement of levers to the chains which pass over the quadrants R or S. This will tend to rotate the quadrant in the direction of the pull and will cause the shaft P to rotate in the same direction. This also causes the small recessed wheels O to rotate in the same direction and as the bolts N are also rotated around the shaft P, as these bolts rotate the arms I are pulled by them, and the bolts K are thus pulled toward the center of the shaft P. This causes the connecting-links G and J to assume a more perpendicular direction, and, as the upper plate M is fastened to the car or truck frame, the lower plate D and shoe C are alone free to move and are thrust down until the shoe C engages the top of the track-rail.

To stay this brake and prevent any displacement by side or end strains, the brace T connects the plate D through suitable rods to the body of the car or truck. The upward movement of the shoe C and plate D is allowed for by suitable slots in the plate of the brace T, in which slots work the bolts W.

It is manifest that power applied at either end of the car tends to operate the brake; or the power can be applied at both ends of the car at the same time. The heavier the load the more effective will be the braking-power.

The brake is so designed that the variations of the height of the car-body as caused by heavy and light loads acting on the springs will not cause the brake to drag or fail to operate.

What we claim as our invention, and desire to secure by Letters Patent, is—

The combination, in a track-brake, of the horizontal shaft P, with the wheels O and with the horizontal connecting-arms I and with the upper and lower connecting-links J and G and with the upper plate M and the lower plate D and with the quadrants R and S, together with the lever V and the weight U and with the stay-brace T, whereby a pulling motion at the circumference of the quadrants R and S is converted into a rotary motion of the shaft P and of the wheels O, and through the connecting-arms I and the upper and lower connecting-links J and G the said rotary motion is converted into a downward thrust of the lower plate D, to which is attached the brake-shoe, all substantially as set forth.

FRED W. WOOD.
JOHN FOWLER.

Witnesses:
  EDGAR E. LEFEBORE,
  F. EDWARD GRAY.